(12) United States Patent
Rossi Tison et al.

(10) Patent No.: US 11,989,903 B2
(45) Date of Patent: May 21, 2024

(54) DEVICE FOR CHARACTERIZING A FIRE AND ASSOCIATED METHOD FOR DETERMINING RADIANT FLUXES

(71) Applicants: UNIVERSITÉ DE CORSE P PAOLI, Corte (FR); Centre National de la Recherche Scientifique, Paris (FR)

(72) Inventors: Lucile Rossi Tison, Afa (FR); Frédéric Morandini, Corte (FR); Tom Toulouse, Corte (FR); Xavier Silvani, Ajaccio (FR)

(73) Assignees: UNIVERSITÉ DE CORSE P PAOLI, Corte (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 367 days.

(21) Appl. No.: 17/289,994

(22) PCT Filed: Oct. 22, 2019

(86) PCT No.: PCT/FR2019/052508
§ 371 (c)(1),
(2) Date: Apr. 29, 2021

(87) PCT Pub. No.: WO2020/089541
PCT Pub. Date: May 7, 2020

(65) Prior Publication Data
US 2021/0398309 A1 Dec. 23, 2021

(30) Foreign Application Priority Data
Oct. 31, 2018 (FR) ........................................ 1860119

(51) Int. Cl.
*G06T 7/62* (2017.01)
*H04N 13/239* (2018.01)

(52) U.S. Cl.
CPC .............. *G06T 7/62* (2017.01); *H04N 13/239* (2018.05); *G06T 2207/10012* (2013.01); *G06T 2207/10048* (2013.01)

(58) Field of Classification Search
CPC ................................ G06T 7/62; H04N 13/239
See application file for complete search history.

(56) References Cited

U.S. PATENT DOCUMENTS

| 5,218,345 A | 6/1993 | Muller et al. |
| 7,843,488 B2 | 11/2010 | Stapleton |
| 2017/0195654 A1* | 7/2017 | Powers ................ G02B 27/106 |

OTHER PUBLICATIONS

Rossi et al. "Estimating the surface and volume of laboratory-scale wildfire fuel using computer vision" vol. 6, Issue 8, Nov. 2012, p. 1031-1040 DOI: 10.104 9/iet-ipr.2012.0056 , Print ISSN 1751-9659, Online ISSN 751-9667 (Year: 2012).*

(Continued)

*Primary Examiner* — Edward Park
(74) *Attorney, Agent, or Firm* — TraskBritt (57) ABSTRACT

A device for characterizing a fire comprises at least one stereovision system and at least one processing unit. The at least one stereovision system comprises a first and a second image capture unit. The at least one processing unit is configured to determine at least one geometric characteristic of the fire. The processing unit is also configured to determine a radiative flux of this fire on the basis of a calibrated linear relationship established between a radiative flux of a reference fire as a function of at least one of the geometric characteristics of the fire and of at least one fire category in order to be able to determine zones exposed to a radiative flux that exceeds a reference threshold. The present disclosure also relates to a method for determining radiative fluxes that implements such a fire characterizing device.

16 Claims, 6 Drawing Sheets

(56) References Cited

OTHER PUBLICATIONS

Zarate et al. "Establishing safety distances for wildland fires" Fire Safety Journal, vol. 43, Issue 8, (Mar. 2008) pp. 565-575, ISSN 0379-7112, https://doi.org/10.1016/j.firesaf.2008.01.001. (https://Avww.sciencedirect.com/science/article/pii/S0379711208000039) (Year: 2008).*
Rossi et al. "Image processing and vision for the study and the modeling of spreading fires" 2012 3rd International conference on Image Processing Theory, Tools and Applications (IPTA), Istanbul, Turkey, 2012, pp. 47-52, doi: 0.1109/IPTA.2012.6469512. (Year: 2012).*
Anderson, "Heat Transfer and Fire Spread," USDA Forest Service Research Paper INT-69, (1969), 29 pages.
Ko et al., "Fire detection and 3D surface reconstruction based on stereoscopic pictures and probabilistic fuzzy logic," Fire Safety Journal, vol. 68, (2014), pp. 61-70.
Martinez-De Dios, "Automatic Forest-Fire Measuring Using Ground Stations and Unmanned Aerial Systems," Sensors (Jun. 2011) 11, 6328-6353; doi:10.3390/s110606328.
Martinez-De Dios "Computer vision techniques for forest fire perception" Image and Vision Computing 26 (2008) 550-562.
Merino et al. "Computer vision techniques for fire monitoring using aerial images" IEEE 2002 28th Annual Conference of the Industrial Electronics Society. IECON 02, Seville, Spain, 2002, pp. 2214-2218 vol.3, doi: 10.1109/IECON.2002.1185316.
Milovanovic et al. "Comparison of the Measurement Results of Large Scale Façade Fire Tests Using IR Thermography and Thermocouples" Proceedings of the International Conference in Dubrovnik, Oct. 15-16, 2015; pp. 417-422.
Pastor et al. "Experimental methodology for characterizing flame emissivity of small scale forest fires using infrared thermography techniques" Forest Fire Research & Wildland Fire Safety, Viegas (ed.) © 2002 Millpress, Rotterdam, ISBN 90-77017-72-0.
International Search Report for International Application No. PCT/FR2019/052508, dated Jan. 13, 2020, 8 pages (with English Translation).
International Written Opinion for International Application No. PCT/FR2019/052508, dated Jan. 13, 2020, 17 pages (with English machine translation).
Rossi et al "Instrumentation of Spreading Fires: Toward the Development of a Metrological System Based on Stereovision" Chia Laguna, Cagliari, Sardinia, Italy, Sep. 11-15, 2011, 11 pages.
Rossi et al. "An analytical model based on radiative heating for the determination of safety distances for wildland fires" Fire Safety journal 46 (Jul./Aug. 2011) 520-527.
Rossi et al. "Estimating the surface and volume of laboratory-scale wildfire fuel using computer vision" vol. 6, Issue 8, Nov. 2012, p. 1031-1040 DOI: 10.1049/iet-ipr.2012.0056, Print ISSN 1751-9659, Online ISSN 1751-9667.
Rossi et al, Estimating the Surface and Volume of Laboratory-Scale Wildfire Fuel Using Computer Vision, academia.edu, (as early as 2012), 30 pages.
Rossi et al. "Image processing and vision for the study and the modeling of spreading fires" 2012 3rd International Conference on Image Processing Theory, Tools and Applications (IPTA), Istanbul, Turkey, 2012, pp. 47-52, doi: 10.1109/IPTA.2012.6469512.
Rossi et al. "Simplified flame models and prediction of the thermal radiation emitted by a flame front in an outdoor fire" Combustion Science and Technology, Taylor & Francis, 2010, 182, pp. 1457-1477.
Rossi et al. "Estimation of spreading fire geometrical characteristics using near infrared stereovision" Proceedings of SPIE—The International Society for Optical Engineering, (2013), 8650. 10.1117/12.2001624.
Rossi et al., "Utilisation de la stéréovision visible et proche infrarouge pour la mesure de données expérimentales dans le cadre d'une recherche pluridisciplinaire sur les feux de forêt," PhD diss., Université Pascal Paoli; Université Laval (Quebec, Canada), 2015, 28 pages (including English machine translation).
Sudheer "Characterization of Open Pool Fires and Study of Heat Transfer in Bodies Engulfed in Pool Fires," Indian Inst. of Tech. Bombay, (Jul. 2013) 10.13140/RG.2.1.5150.3841, 223 pages.
Toulouse, "Estimation par stéréovision multimodale de caractéristiques géométriques d'un feu de végétation en propagation," PhD diss., Université Pascal Paoli; Université Laval (Québec, Canada), 2015, 519 pages (including English machine translation).
Usamentiaga et al. "Infrared Thermography for Temperature Measurement and Non-Destructive Testing" Sensors (Jul. 2014) 14, 12305-12348; doi:10.3390/s140712305.
Zarate et al. "Establishing safety distances for wildland fires" Fire Safety Journal, vol. 43, Issue 8, (Mar. 2008) pp. 565-575, ISSN 0379-7112, https://doi.org/10.1016/j.firesaf.2008.01.001. (https://www.sciencedirect.com/science/article/pii/S0379711208000039).

* cited by examiner

DEVICE FOR CHARACTERIZING A FIRE AND ASSOCIATED METHOD FOR DETERMINING RADIANT FLUXES

CROSS-REFERENCE TO RELATED APPLICATIONS

This application is a national phase entry under 35 U.S.C. § 371 of International Patent Application PCT/FR2019/052508, filed Oct. 22, 2019, designating the United States of America and published as International Patent Publication WO 2020/089541 A1 on May 7, 2020, which claims the benefit under Article 8 of the Patent Cooperation Treaty to French Patent Application Serial No. 1860119, filed Oct. 31, 2018.

TECHNICAL FIELD

The present disclosure relates to the field of characterizing a fire. More particularly, the present disclosure relates to determining thermal flux radiated from a fire on the basis of optical means.

BACKGROUND

Fires, such as forest fires or industrial fires for example, present a major risk for many regions in the world such as for example the Mediterranean basin (*Corsica*, southern France, Spain, Italy, Greece, etc.), Australia, and the southwestern United States (California, Arizona, etc.). They are also an ongoing risk for installations classées pour la protection de l'environment (sites classified for environmental protection) on islands where the use of thermal power systems for the production of electricity requires the storage of liquid and gaseous hydrocarbon fuels. In all cases, fires cause environmental damage (deforestation, desertification, air pollution by emitting greenhouse gases and particulates, recirculation of heavy metals and radionuclides) and human and financial losses (destruction of housing and other buildings, destruction of fire control equipment).

For forest fires, more than 350 million hectares of vegetation are destroyed each year on our planet. In addition, these fires are sources of significant expenditure, both in terms of equipment and personnel, and in associated control costs. For example, in 2018 in California in the United States, fires burned approximately 120,000 hectares of vegetation and 7,000 homes, causing dozens of deaths and injuries and mobilizing around 30,000 firefighters. The total cost of the 2018 summer fires in California was more than 2 billion US dollars. In addition, due to global warming, the frequency of fires is at risk of increasing along with the costs of control and damage if effective control means are not put in place.

To limit the impact of this major risk, prevention and control actions are carried out. The effectiveness of these two types of action is linked to the knowledge of the phenomena that occur during the propagation of fires.

Thus, much work has been done to determine the phenomena that occur during the propagation of fires. Much work has been done to determine measurement instruments based on computer vision in order to be able to determine certain geometric characteristics of the fire that describe the evolution of a fire. It is possible, for example, to cite the thesis of Doctor Tom Toulouse entitled "Estimation par stéréovision multimodale de caractéristiques géométriques d'un feu de végétation en propagation" [Estimation by multimodal stereovision of geometric characteristics of a propagating wildfire], defended on Nov. 13, 2015, or the following articles:

"Image processing and vision for the study and the modeling of spreading fires," L. Rossi et al., Image Processing Theory, Tools and Applications, 2012;

"Estimation of spreading fire geometrical characteristics using near infrared stereovision," L. Rossi et al., Electronic Imaging 2013, San Francisco, United States;

"Utilisation de la stereovision visible et proche infrarouge pour la mesure de données expérimentales dans le cadre d'une recherche pluridisciplinaire sur les feux de forêt" [Use of visible and near-infrared stereovision for the measurement of experimental data in the context of multidisciplinary research on forest fires], L. Rossi et al.;

"Computer vision techniques for forest fire perception," Martinez-de-Dios et al., Image and vision computing, 26, 2008, pp. 550-562.

However, these various articles disclose only computer and vision tools that allow the geometric characteristics of fires to be determined without allowing the thermal impact, and therefore the risk in zones adjacent to the fire, to be estimated. More particularly, current vision devices do not allow the estimation of a radiative flux in a predetermined zone adjacent to the fire. Determining the radiative fluxes in this region may make it possible, for example, to control firefighting personnel or the movement of equipment deployed in the field, and also to adapt the amount of water to be sent to the fire, or to determine the fire zones that are in need of urgent treatment in order to limit the spread of this fire. Such measurements are currently possible, but they are difficult to implement because they require the use of intrusive sensors with respect to the fire; more particularly, it is necessary to position the flux sensor where it is desired to measure this flux, which may expose operators and equipment to some danger.

Additionally, known from the article "Comparison of the measurement results of large scale façade fire tests using IR thermography and thermocouples," Milovanovic & Pecur, Proceedings of the international conference in Dubrovnik, 2015, is a device comprising an infrared camera allowing the temperature of a burning wall to be determined. However, this document makes no mention of potentially determining a radiative flux emitted by this fire in order to be able, for example, to control responders in the field.

Next, known from the article "Simplified flame models and prediction of the thermal radiation emitted by a flame front in an outdoor fire," J. L. Rossi et al., Combustion Science Technology, Taylor & Francis, 2010, 182, pp. 1457-1477, is a method for calculating a radiative flux emitted by a fire. The different relationships used to calculate the radiative flux are quite complex and therefore difficult to implement in the field. In addition, these relationships require significant computing power and may lead to long response times.

The article "Estimating the surface and volume of laboratory scale wildfire fuel using computer vision," by L. ROSSI et al., deals for example with the fine-scale and live determination of fires by means of computer vision, but does not mention calculating thermal flux.

The article "Establishing safety distances for wildland fires," by L. ZARATE et al., deals with the calculation of the thermal flux around a fire, but is based on the modeling of the fire in a simplified and approximate way, in the form of a vertical and rectangular planar surface, which leads to significant deviations, in particular at distances shorter than a few tens of meters from the fire in question. The use of this method to distribute firefighters around the fire, for example, is therefore potentially dangerous, or in any case will not allow the firefighters to be distributed as close as possible to said fire in order to fight it better.

BRIEF SUMMARY

One object of the present disclosure is to at least partially overcome the drawbacks of the prior art described above by providing a device for characterizing a fire that makes it possible to remotely determine the effect of the thermal radiation from a real fire on targets close to the fire using an optical method, without intrusive contact with the fire.

Another object of the disclosure, different from the above object, is to provide a device for characterizing a fire that makes it possible to determine a radiative flux in the vicinity of a fire, affording an improved response time.

Another object of the present disclosure, different from the above objects, is to provide a device for characterizing a fire that is easily movable.

Another object of the present disclosure, different from the above objects, is to provide a method for determining radiative fluxes of a fire which is easy to use and/or affords improved response times.

In order to at least partially achieve at least one of the aforementioned objects, one subject of the present disclosure is a device for characterizing a fire, comprising:

- at least one stereovision system comprising a first and a second image capture unit that are configured to take images of a fire, said first and second image capture units each having an optical axis, said first and second optical axes being separated from one another by a predetermined distance at the first and second image capture units; and
- at least one processing unit configured to combine the images taken by the first and second image capture units of at least one stereovision system in order to determine at least one geometric characteristic of the fire, the processing unit being configured to determine a radiative flux of this fire on the basis of a calibrated linear relationship established between a radiative flux of a reference fire as a function of at least one of the geometric characteristics of the fire and of at least one fire category chosen from among a plurality of predetermined fire categories in order to be able to determine zones exposed to a radiative flux emitted by the fire that exceeds a reference threshold.

The use of a linear relationship calibrated with one of the geometric characteristics of the fire makes it possible to easily and simply determine, in the field, the radiative fluxes emitted by the fire and thus to determine zones in which the radiative fluxes emitted by the fire exceed a threshold value in order to be able, for example, to control the movement of responding units on the ground, the responding units comprising both personnel and equipment, such as, for example, firefighting vehicles. Specifically, the use of a linear relationship does not require substantial computing power and therefore makes it possible to provide a measurement of the radiative fluxes emitted by the fire quickly.

Additionally, the combination of the geometries of the fire and the determination of the associated radiative fluxes make it possible to aid in determining fire management scenarios in order to limit the impact of said fire. For example, it is possible to reduce the impact of this fire by targeting the water directed onto this fire at a critical point of the fire identified by the stereovision system. Additionally, it is also possible to reduce the amounts of water needed to fight this fire by targeting this critical point of the fire for example.

Furthermore, the use of such an optical system makes it possible to estimate a radiative flux at an at-risk location, that is to say one close to the fire, while keeping operational personnel and equipment at a distance and therefore out of danger.

The device for characterizing a fire according to the present disclosure may also comprise one or more of the following features, taken alone or in combination.

The predetermined distance between the first and second optical axes at the first and second image capture units of the stereovision system may be chosen as a function of the distance between the stereovision system and the fire.

The device for characterizing a fire may further comprise an anemometer configured to determine characteristics of the wind, said anemometer being connected to the processing unit, the processing unit being configured to correct the determined radiative flux of the fire as a function of the characteristics of the wind.

According to this aspect, the characteristics of the wind may comprise the wind speed and/or wind direction.

The at least one stereovision system may further comprise a locating system with centimeter precision, configured to transmit, to the at least one processing unit, the position, inclination and orientation of the first and second optical axes of the first and second image capture units of the stereovision system.

The processing unit may be configured to map the geometric characteristics of the fire and the radiative fluxes of different zones exposed to a radiative flux emitted by the fire, said processing unit being in communication with a display unit configured to display this map.

According to one particular embodiment, the at least one stereovision system may be a multimodal stereovision system configured to take images in the visible range on the one hand and images in the near-infrared range on the other hand.

According to a first variant of this particular embodiment, the first and second image capture units of the multimodal stereovision system may both be configured to take images in the visible range and in the near-infrared range.

According to a second variant of this particular embodiment, the first image capture unit of the multimodal stereovision system may be configured to take images in the visible range and the second image capture unit of the multimodal stereovision system may be configured to take images in the near-infrared range.

According to one aspect, the processing unit may be configured to track at least one geometric characteristic of the fire as a function of time so as to determine the temporal evolution of the fire and to track the radiative fluxes of the different zones exposed to a radiative flux emitted by the fire as a function of this temporal evolution of the fire.

The at least one geometric characteristic of the fire may be chosen from: the area of the fire front, the fire area, or the fire volume.

According to another particular embodiment, the device for characterizing a fire may comprise a single stereovision system and the processing unit may be configured to determine the radiative flux on the basis of a linear relationship with a two-dimensional geometric characteristic of the fire.

According to this other embodiment, the use of a single stereovision system makes it possible to determine the fire area, the dimensions of the fire front, or the area of the fire front.

The two-dimensional geometric characteristic of the fire may be represented by a three-dimensional curve.

According to one aspect of this other particular embodiment, the calibrated linear relationship may satisfy the following equation:

$$F = \beta \cdot S_F$$

with:
F: the value of the determined radiative flux in kW/m²;
β: a calibration coefficient; and
$S_F$: the area of the fire front measured in square meters.

According to yet another particular embodiment, the device for characterizing a fire may comprise two stereovision systems configured to be arranged so as to take different viewing angles of the fire in order to determine the fire volume and the processing unit may be configured to determine the radiative flux on the basis of a linear relationship with a two-dimensional or three-dimensional geometric characteristic of the fire.

According to one aspect of this particular embodiment, the calibrated linear relationship may satisfy the following equation:

$$F = \gamma \cdot V$$

with:
F: the determined value of the radiative flux in kW/m²;
γ: a calibration coefficient; and
V: the fire volume measured in cubic meters.

According to this other particular embodiment, the angle formed by the first and second optical axes of one of the stereovision systems and the first and second optical axes of the other stereovision system may be between 90° and 180°.

The processing unit may be configured to perform triangulation in order to obtain a closed shape on the basis of which the fire area or volume may be calculated.

Alternatively or in addition, the processing unit may be configured to calculate the frontal area of the fire with respect to a target, or a form factor of this fire.

The predetermined fire categories may comprise one of the following categories: forest fires, liquid fires, or industrial fires, said predetermined fire categories potentially comprising a particular combustible material.

The processing unit may be configured to determine an uncertainty in the position of the fire on the ground along an axis transverse to the fire, said uncertainty in the position of the fire on the ground being determined by the relationship:

$$\Delta z = \frac{z^2}{Bf} \Delta d$$

in which:
z corresponds to the real distance between the fire and at least one stereovision system (in meters),
B corresponds to the distance between the first and second optical axes (in meters) at the first and second image capture units of at least one stereovision system,
f corresponds to the focal length of the first and second image capture units (in pixels) of at least one stereovision system, and
Δd is the uncertainty in the disparity of the pixels (in pixels).

According to one aspect, the device for characterizing a fire may further comprise a controller configured to control the triggering of the recordings by the first and second image capture units of at least one stereovision system simultaneously.

The controller may trigger the simultaneous recordings by the different first and second image capture units of the device for characterizing a fire when this device comprises more than one stereovision system.

The controller may be a radio controller.

The device for characterizing a fire may further comprise a database in communication with the processing unit, said database being configured to store at least the calibrated linear relationships with the geometric characteristics of the fire and the predetermined fire categories.

According to one aspect, the device for characterizing a fire may further comprise a bar on which the first and second image capture units of the stereovision system are arranged.

According to this aspect, the first and second image capture units of the stereovision system may be movable on this bar in order to adjust the predetermined distance between the first and second optical axes at the first and second image capture units as a function of the distance between the stereovision system and the fire.

The bar may be set up on a tripod with a height-adjustable rod.

The bar may be connected to the tripod by a clamp configured to allow the bar to rotate on itself in order to adjust the inclination of the first and second optical axes of the first and second image capture units simultaneously.

Another subject of the present disclosure is a method for determining radiative fluxes in zones exposed to a radiative flux emitted by a fire, the method implementing a device for characterizing a fire as defined above, said device for characterizing a fire comprising at least one stereovision system having a first and a second image capture unit and a processing unit, and the method comprises the following steps:
positioning of at least one stereovision system so that the first and second image capture units of the stereovision system have a view in at least two dimensions of the fire,
entering into the processing unit of the distance between the stereovision system and the periphery of the fire closest to the stereovision system, and the fire category,
triggering of the taking of images of the fire by the first and second image capture units of at least one stereovision system,
determining of at least one geometric characteristic of the fire by the processing unit,
determining of a radiative flux in different zones exposed to a radiative flux emitted by the fire by the processing unit using a calibrated linear relationship with at least one geometric characteristic of the fire and at least one fire category chosen from among a plurality of predetermined fire categories, and
depicting of a map showing the geometric characteristics of the fire and the radiative fluxes in different zones exposed to a radiative flux emitted by the fire on a display unit in communication with the processing unit.

Such a method for determining radiative fluxes emitted by a fire is simple to implement since it requires only the use of a linear relationship once the geometric characteristics of the fire have been determined. Additionally, the selection of a fire category makes it possible to have increased accuracy in the measured radiative fluxes. Moreover, the use of a linear relationship does not require high computing power, which makes it possible in particular to obtain the radiative fluxes in different zones close to the fire simply and rapidly.

The method for determining radiative fluxes in zones exposed to a radiative flux emitted by a fire may further comprise one or more of the following features, taken alone or in combination.

According to one particular embodiment, only the radiative fluxes that have a value higher than a predetermined threshold are displayed on the display unit so as to define danger zones.

According to another particular embodiment, the display unit may display the critical point of the fire in order to target the zones onto which water is directed in order to allow this fire to be fought more effectively.

According to one aspect, the method of determining radiative fluxes may further comprise a step of positioning and locating an anemometer in communication with the processing unit, said step of positioning and locating the anemometer being carried out upstream of the step of entering into the processing unit of the distance between the stereovision system and the fire.

According to this aspect, the anemometer may be arranged at a height of 2 meters from the ground.

The anemometer may perform analyses of characteristics of the wind with a frequency of 1 Hz.

According to this aspect, the method for determining radiative fluxes may comprise a step of measuring the characteristics of the wind so that the processing unit corrects the value of the radiative flux determined as a function of these characteristics of the wind in the step of determining a radiative flux.

The first and second image capture units of at least one stereovision device may be configured to take between 1 and 10 images per second.

The method for determining radiative fluxes may further comprise a step of reconfiguring the processing unit in the event of moving the stereovision system or of modifying the distance between the stereovision system and the periphery of the fire closest to the stereovision system.

The step of determining at least one geometric characteristic of the fire, the step of determining a radiative flux and the depicting step may be reiterated for each image taken by at least one stereovision system in order to allow the temporal evolution of the radiative fluxes in the zones exposed to a radiative flux emitted by the fire to be determined.

According to one particular embodiment, the method for determining radiative fluxes may further comprise a step of superimposing the images taken in the visible range and in the near-infrared range, said superimposing step being carried out between the step of triggering the taking of images of the fire and of determining at least one geometric characteristic of the fire.

BRIEF DESCRIPTION OF THE DRAWINGS

Other features and advantages of the present disclosure will become more clearly apparent from reading the following description and the appended drawings, in which:

FIG. 2 schematically shows, in perspective, a stereovision system from FIG. 1, FIG. 3 schematically shows, in perspective, a stereovision system on board a motor vehicle, FIG. 4 schematically shows a device for determining calibration values for the device for characterizing a fire from FIG. 1, FIG. 5A schematically shows a curve illustrating a radiative flux as a function of a fire area, FIG. 5B schematically shows a curve illustrating a radiative flux as a function of a fire volume, FIG. 6 schematically shows a curve representing the average evolution of a radiative flux and of a fire volume over time, FIG. 7 schematically shows the correlation between the fluctuations around the average value of the different parameters of a fire with those of different radiative flux sensors arranged at a plurality of locations in front of a flame front, FIG. 8A schematically shows, from above, a fire with two stereovision devices according to a first particular embodiment, FIG. 8B schematically shows, from above, a fire with two stereovision devices according to a second particular embodiment, FIG. 9A schematically shows fire points extracted from the images taken by the stereovision devices from FIG. 8A or 8B, FIG. 9B schematically shows, in perspective, a fire model resulting from the combination of the images taken by the stereovision devices from FIG. 8A or 8B, and FIG. 10 schematically shows a flowchart illustrating different steps of a method for determining radiative fluxes.

DETAILED DESCRIPTION

Identical elements in the various FIGS. bear the same numerical references.

The following embodiments are examples. Although the description refers to one or more embodiments, this does not necessarily mean that each reference relates to the same embodiment, or that the features apply only to a single embodiment. Individual features of different embodiments may also be combined and/or interchanged to provide other embodiments.

In the following description, certain components or parameters may be indexed, for example first element or second element and also first parameter and second parameter or even first criterion and second criterion, etc. In this case, it is merely a matter of simple indexation allowing similar but non-identical elements to be differentiated and designated and such designations may readily be interchanged without departing from the scope of the present description. In addition, this indexation does not imply an order in time with respect to a given criterion.

Figure 1:
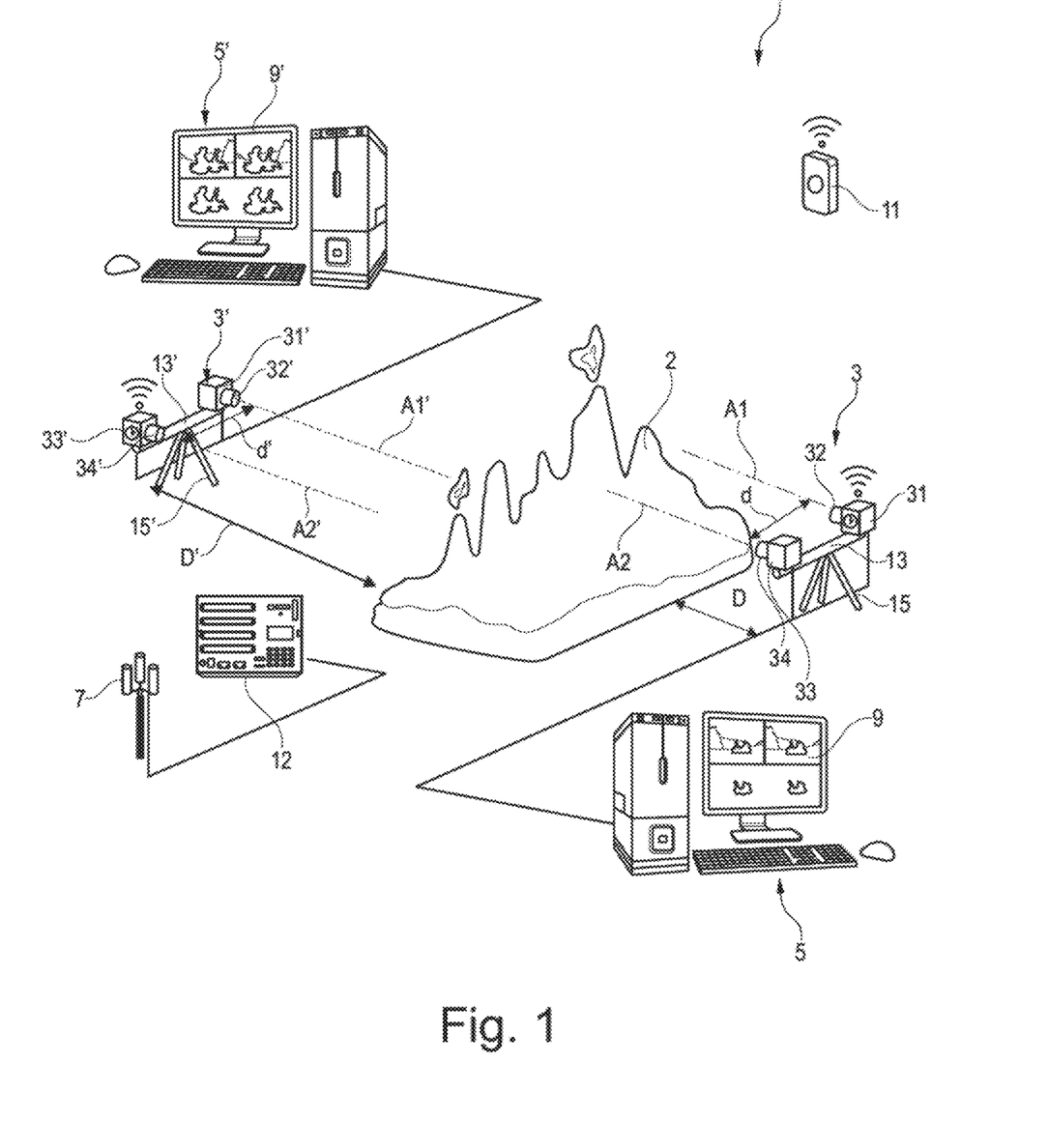
FIG. 1 schematically shows a device for characterizing a fire.

With reference to FIG. 1, a device for characterizing a fire 1 is shown. The device for characterizing a fire 1 comprises at least one stereovision system 3 and at least one processing unit 5.

The stereovision system 3 comprises a first 31 and a second 33 image capture unit configured to take images of a fire 2. The first 31 and second 33 image capture units may be placed at a predetermined height from the ground, such as for example at a height of between 1 meter and 3 meters. In addition, the first 31 and second 33 image capture units each have an optical axis A1, A2. The first A1 and second A2 optical axes are separated from one another by a predetermined distance d at the first 31 and second 33 image capture units. More particularly, the first 31 and second 33 image capture units each have an optic 32, 34 and the predetermined distance d is measured at these first 32 and second 34 optics. The predetermined distance d between the first A1 and second A2 optical axes of the first 31 and second 33 image capture units of the stereovision system 3 may be chosen as a function of a distance D between the stereovision system 3 and the fire 2. For example, this predetermined distance d between the first A1 and second A2 optical axes may be 1 m when the distance D separating the stereovision system 3 from the fire 2 is approximately 12 m. Furthermore, the first A1 and second A2 optical axes of the stereovision system 3 are in particular arranged parallel to one another.

Additionally, the processing unit 5 is configured to combine the images taken by the first 31 and second 33 image capture units of the at least one stereovision system 3 in order to determine at least one geometric characteristic of the fire. This at least one geometric characteristic of the fire may be chosen from the fire area S, or the fire volume V (visible in particular in FIG. 7), a frontal area of the fire with respect to a target, the area of the fire front with respect to a target, or a form factor of this fire. The fire area S or the area of the fire front with respect to a target correspond to a two-dimensional geometric characteristic of the fire within the meaning of the present description. This two-dimensional geometric characteristic of the fire is represented by a three-dimensional curve. The fire volume V then corresponds to a three-dimensional geometric characteristic of the fire within the meaning of the present description. The processing unit 5 may in particular be configured to perform a triangulation, such as for example a Delaunay triangulation, in order to obtain a closed surface on the basis of which the fire area S or the fire volume V may be calculated. Additionally, the processing unit 5 is configured to determine a radiative flux F (shown with reference to FIGS. 5A to 6 for example) of this fire 2 on the basis of a calibrated linear relationship established between a radiative flux of a reference fire as a function of at least one of the geometric characteristics of the fire and of at least one fire category chosen from among a plurality of predetermined fire categories, as described in more detail later, in order to be able to determine zones exposed to a radiative flux F emitted by the fire 2 that exceeds a reference threshold. According to the present description, what is meant by radiative flux F is an energy per unit time, in particular heat energy, received per unit area, expressed in $kW/m^2$ per second. In addition, what is meant by fire category within the meaning of the present description is the type of fuel feeding this fire 2. Non-exhaustively, these fire categories may comprise forest fires, liquid fires, or industrial fires. Furthermore, these fire categories may comprise a particular combustible material, such as, for example, wood or a specific type of wood such as fir or oak, dry or wet vegetation such as for example dry grass, maquis, or garrigue for forest fires, the chemical family of the fuel for liquid fires, such as alcohols, aldehydes, ketones, ethers, hydrocarbons, or oils and potentially particular compounds in these chemical families such as ethanol, propanol, diethyl ether, acetone, or gasoline, in the context of industrial fires one predetermined category, for example, may be fires of metal origin (for which the combustible material may for example be sodium metal, or white phosphorus), fires for which the combustible material is a plastic or a particular type of plastic, or for which the combustible material is rubber. Indeed, depending the fire category in question, the calibration coefficients of the linear relationship may be modified and therefore the radiative fluxes F also determined. Additionally, what is meant by linear relationship in the following description is a relation of proportionality between the radiative flux F and at least one geometric characteristic of the fire. In addition, this linear relationship is calibrated because it is based on radiative fluxes resulting from geometric characteristics determined beforehand using flux sensors C1-C4 (shown with reference to FIG. 4) as explained in more detail later.

Thus, this device for characterizing a fire 1 makes it possible to simply and quickly determine the radiative fluxes F surrounding the fire 2 in order to be able, for example, to move firefighting units on the ground, comprising firefighting personnel and equipment such as, for example, vehicles, in order to more effectively fight this fire 2 and to prevent their exposure to a radiative flux that exceeds a predetermined threshold which could threaten their integrity. In addition, the optical measurement performed on the basis of the stereovision images taken by the first 31 and second 33 image capture units make it possible to obtain thermal images of the fire 2. Furthermore, this device for characterizing a fire 1 makes it possible to combine the vision of this fire 2 in order to determine at least one geometric characteristic of this fire and a physical measurement, namely the radiative flux, without having to use intrusive sensors which may be used only with great difficulty under operational conditions. This device for characterizing a fire 1 therefore makes it possible to extend the vision of the first 31 and second 33 image capture units beyond the initial pattern and to allow at least one physical measurement to be performed without using an intrusive sensor. Thus, this stereovision system 3 makes it possible to estimate the radiative flux F at an at-risk location while keeping operational personnel and equipment out of danger. The combination of the geometries of the fire and the determination of the associated radiative fluxes F make it possible to aid in determining scenarios for managing the fire 2 in order to limit its impact. For example, it is possible to reduce the impact of this fire 2 by targeting the water directed onto this fire 2 at a critical point of the fire identified by the stereovision system 3. Additionally, it is also possible to reduce the amounts of water needed to fight this fire 2 by targeting this critical point of the fire for example. Specifically, the use of a linear relationship between the radiative flux F and a geometric characteristic of the fire and at least one fire category does not require high computing power, which makes it possible to have a rapid response time. Furthermore, such a device for characterizing a fire 1 may be used equally to determine the radiative fluxes F of a fixed fire 2, such as for example an industrial fire, or of a spreading fire, such as for example of a forest fire. The at least one processing unit 5 may be configured to map the geometric characteristics of the fire and the radiative fluxes F of different zones exposed to a radiative flux F emitted by the fire 2. In addition, the processing unit 5 may be configured to track at least one geometric characteristic of the fire as a function of time so as to determine the temporal evolution of the fire 2 and to track the radiative fluxes F of the different zones exposed to a radiative flux emitted by the fire 2 as a function of this temporal evolution of the fire 2.

Furthermore, the device for characterizing a fire 1 has a display unit 9 in communication with the processing unit 5. This display unit 9 may be fixed and connected physically, by means of a cable for example, to the processing unit 5, such as for example a screen, or it may be mobile and in communication with the processing unit 5 via a wireless link for example. When the display unit 9 is mobile, it may for example be a tablet, a smartphone, or a screen integrated into the helmets of firefighting units, in order to be able to inform the firefighting units in real time of the radiative fluxes F emitted by the fire 2 in the zone in which they are located in order to allow them to move and in particular to evacuate along with equipment in the event that the radiative flux F exceeds a reference threshold. More particularly, the display unit 9 is configured to display the map produced by the processing unit 5. This map may in particular show the zones that are exposed to a radiative flux higher than a given value or the one (or more) critical point(s) of the fire to be hosed in order to contain this fire 2. In order to carry out this mapping, it is necessary to have a plurality of points of view of this fire 2. More particularly, it is recommended to take images from in front of the fire front and from one side of this fire. However, other positions for the images may be considered depending on the calibration of the device for characterizing a fire 1.

Additionally, the device for characterizing a fire 1 may further comprise a controller 11 configured to control the triggering of the recordings by the first 31 and second 33 image capture units of the at least one stereovision system 3 simultaneously. This controller 11 may for example be a radio controller, or a controller using other frequency bands in order to allow the triggering of the recordings by the first 31 and second 33 image capture units such as for example the Wi-Fi® or Bluetooth® bands, or the ISM (corresponding to the acronym for Industrial, Scientific and Medical) bands. The simultaneous triggering of the image captures by the stereovision system 3 makes it possible to limit errors in the definition of the geometric characteristics of the fire. Specifically, since these geometric characteristics are determined by the combination of the images taken by the first 31 and second 33 image capture units, their synchronization makes it possible to eliminate the needs of integrating a delay into the images taken by one of the image capture units when determining the geometric characteristics of the fire.

According to the particular embodiment of FIG. 1, the device for characterizing a fire 1 has two stereovision systems 3, 3' respectively connected to a processing unit 5, 5', for example in the form of a computer. According to this particular embodiment, each processing unit 5, 5' has a display unit 9, 9'. Alternatively, not shown here, such a device for characterizing a fire 1 may comprise a single processing unit 5 that receives the images taken by each of the stereovision systems 3, 3' and a single display unit 9 for example. In order to be able to determine the geometric characteristics of the fire in real time, the device for characterizing a fire 1 may have a transceiver system (not shown) configured to transfer the three-dimensional fire points determined by the stereovision systems 3, 3' so as to readjust the different fire points from the images taken by the stereovision systems 3, 3' (as shown with reference to FIG. 9A) and to determine all of the geometric characteristics of the fire.

In addition, the first A1 and second A2 optical axes of one of the stereovision systems 3 are spaced apart from one another by a distance d and the first A1' and second A2' optical axes of the other stereovision system 3' are spaced apart from one another by a distance d'. These distances d and d' may be identical or different depending on the distance D, D' separating the stereovision system 3, 3' from the fire 2.

Additionally, according to this particular embodiment, the device for characterizing a fire 1 may further comprise an anemometer 7 configured to determine characteristics of the wind such as the speed or the direction of the wind. The anemometer 7 is connected to the processing unit 5, 5' in order to transmit the measured characteristics of the wind thereto. In addition, the processing unit 5, 5' may be configured to correct the radiative flux F of the fire 2 as a function of the characteristics of the wind measured by the anemometer 7. Specifically, the wind may influence the radiative flux F of the fire 2 and the presence of this anemometer 7 may allow the map produced by the processing unit 5 to be modified so as to take into account the effects of the wind on the determined radiative fluxes F.

Furthermore, according to this particular embodiment, the controller 11 may trigger the simultaneous recordings by the different first 31, 31' and second 33, 33' image capture units of the device for characterizing a fire 1 when this device comprises a plurality of stereovision systems 3, 3'. This simultaneous triggering of the different image captures makes it possible to synchronize the images taken by the first 31, 31' and second 33, 33' image capture units to determine the geometric characteristics of the fire when using a plurality of stereovision systems 3, 3'.

Alternatively, each stereovision system 3, 3' may comprise a "master" image capture unit, such as for example the first image capture unit 31, 31', and a "slave" image capture unit, such as for example the second image capture unit 33, 33'. The "master" image capture unit comprises an internal clock and dictates the rate of acquisition of the images taken by the "slave" image capture unit. According to this alternative, the controller 11 sends a wave used by the "master" camera of each stereovision system 3, 3' which imposes its clock on the "slave" camera. It is thus also possible to synchronize the image captures by the different image capture units 31, 31', 33, 33'.

Additionally, still according to the particular embodiment of FIG. 1, the device for characterizing a fire 1 may further comprise a database 12 in communication with the processing unit 5. The database 12 is configured to store at least the linear relationships calibrated with the geometric characteristics of the fire and the predetermined fire categories. The database 12 may be in communication with the processing unit 5 via a wired link or via a wireless link. According to the particular embodiment of FIG. 1, the database 12 is remote from the processing unit 5, 5'. According to an alternative not shown here, the database 12 may be integrated into one of the processing units 5, 5' or into each processing unit 5, 5'.

Figure 2:
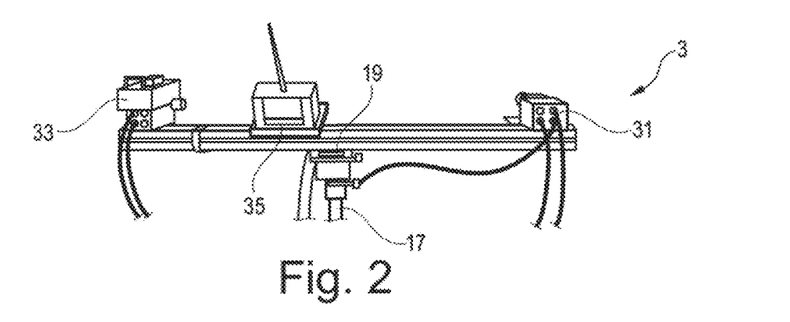
Figure 3:
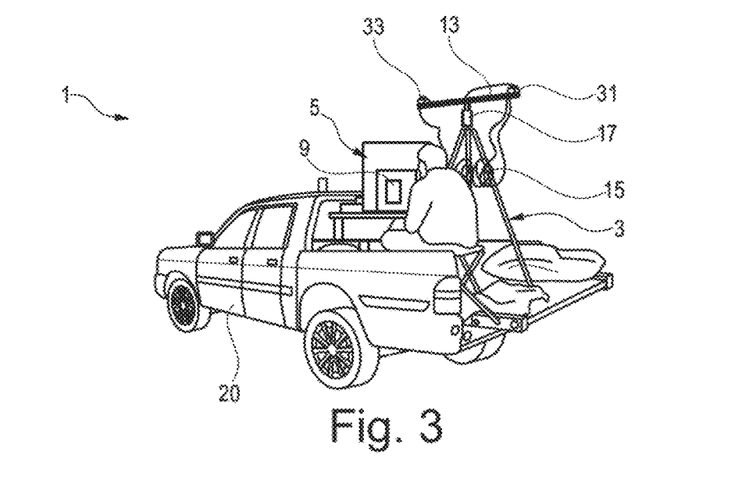

With reference to FIGS. 2 and 3, the stereovision system 3 according to one particular embodiment is shown in more detail. According to this particular embodiment, the stereovision system 3 may further comprise a locating system 35 with centimeter precision and an inertial measurement unit (not shown here). This locating system 35 is configured to transmit, to the at least one processing unit 5, the position of the first A1 and second A2 optical axes of the first 31 and second 33 image capture units of the stereovision system 3. Furthermore, the inertial measurement unit is configured to transmit, to the at least one processing unit 5, the inclination and orientation of the first A1 and second A2 optical axes of the first 31 and second 33 image capture units.

The stereovision system 3 may further comprise a bar 13 on which the first 31 and second 33 image capture units of the stereovision system 3 are arranged. The first 31 and second 33 image capture units of the stereovision system 3 are movable on this bar 13 in order to adjust the predetermined distance d between the first A1 and second A2 optical axes of the first 31 and second 33 image capture units as a function of the distance D between the stereovision system 3 and the fire 2. In addition, the bar 13 is set up on a tripod 15 that has a height-adjustable rod 17 in order to allow simultaneous height adjustment of the first A1 and second A2 optical axes of the stereovision system 3. Additionally, the bar 13 is connected to the tripod 15 by a clamp 19 configured to allow the bar 13 to rotate on itself. This rotation of the bar 13 on itself makes it possible to adjust the inclination of the first A1 and second A2 optical axes of the first 31 and second 33 image capture units simultaneously. Thus, the stereovision system 3 shown with reference to FIGS. 2 and 3 is quick and easy to adjust so as to be able to quickly operate the device for characterizing a fire 1.

According to the particular embodiment of FIG. 3, the device for characterizing a fire 1 is on board a motor vehicle 20. The device for characterizing a fire 1 is therefore easily transportable and compact. Additionally, this device for characterizing a fire 1 may be moved during a fire, and in particular moved closer to or away from the fire depending on the safety rules to be followed according to the radiative fluxes F determined by the processing unit 5. According to one alternative not shown here, the bar 13 may be directly attached to a building, for example, or be attached directly to the motor vehicle 20.

With reference to FIGS. 1 to 3, the stereovision system 3 may be a multimodal stereovision system 3 configured to take images in the visible range on the one hand and images in the infrared range on the other hand. Taking images in the infrared range makes it possible to overcome interference in the images due to the smoke from the fire 2. Indeed, depending on the fuel feeding the fire, smoke of varying darkness and thickness may be formed. In the case of images taken in the visible range, it is possible for this smoke to form a screen and at least partially mask the fire 2, which would be detrimental to determining one of its geometric characteristics in order to be able to derive the radiative fluxes F emitted by this fire 2. In the case of images taken in the infrared range, the presence of this smoke does not interfere with the images taken because they correspond to thermal images of the filmed scene.

According to the particular embodiments shown with reference to FIGS. 1 to 3, the first image capture unit 31 of the multimodal stereovision system 3 is configured to take images in the visible range and the second image capture unit 33 of the multimodal stereovision system 3 is configured to take images in the infrared range.

According to one alternative not shown here, the first 31 and second 33 image capture units of the multimodal stereovision system 3 may both be configured to take images in the visible range and in the infrared range.

More particularly, according to these particular embodiments, the first 31 and second 33 image capture units may be cameras. These cameras may, for example and non-exhaustively, be chosen from among the following:

AD-080GE multispectral camera, manufacturer: JAI, this camera captures images in the visible and infrared ranges and offers a resolution of 1024×768 pixels;

DFK 72BUC02 camera, manufacturer: Image Sourcing, this camera captures images in the visible range and offers a resolution of 1280-960 pixels;

3MW Jade camera, manufacturer: CEDIP, this camera captures images in the infrared range and offers a resolution of 256×256 pixels;

One Pro camera, manufacturer: FLIR, this camera captures images in the infrared range and offers a resolution of 1440×1080 pixels;

IR-TCM 384 camera, manufacturer: Jaenoptik, this camera captures images in the infrared range and offers a resolution of 384×576 pixels; or XB3 Bumblebee camera, manufacturer: Point Gray, this camera captures images in the visible range and offers a resolution of 1280×960 pixels.

Figure 4:
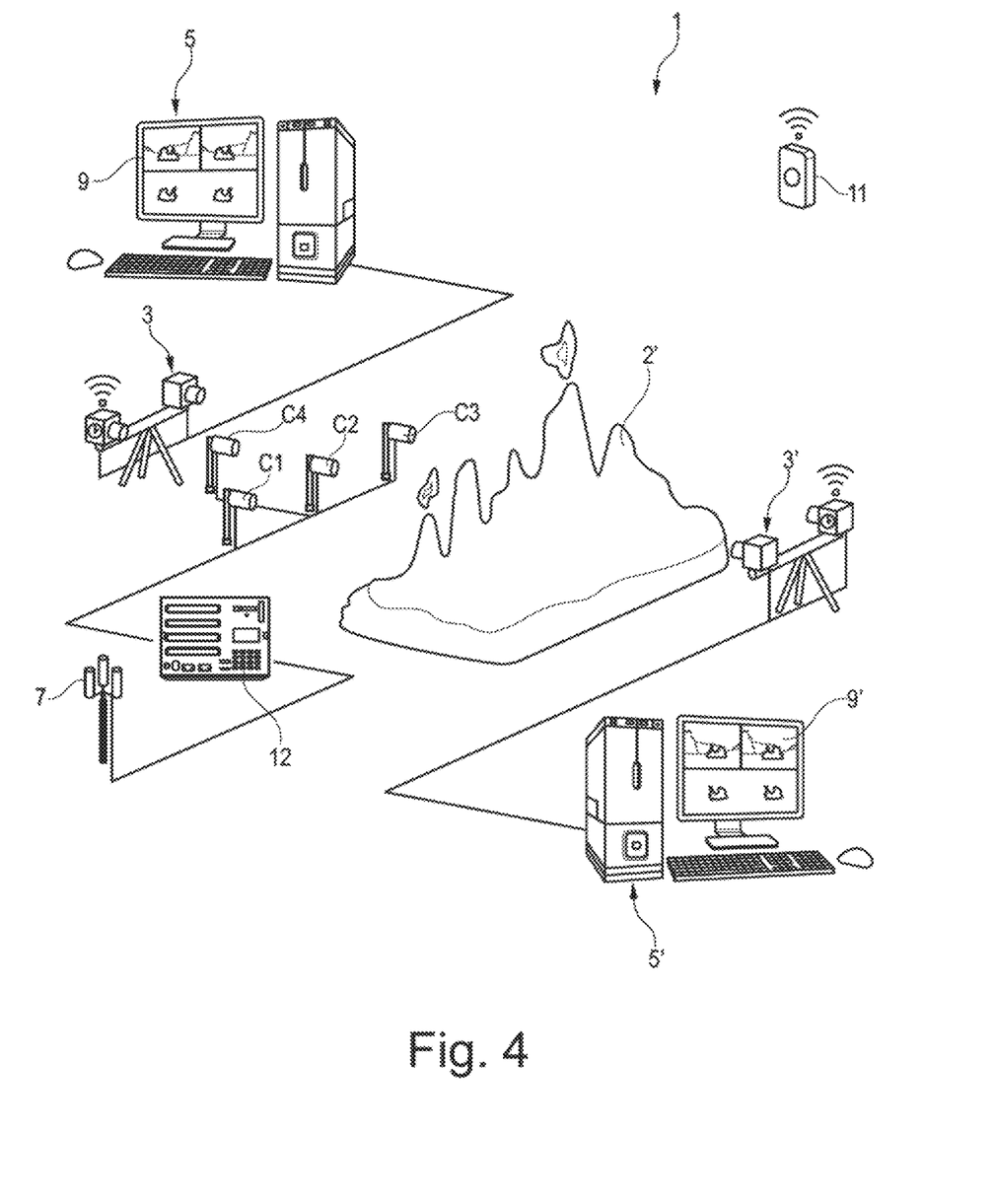

The inventors of the present disclosure have identified a linear relationship present between the radiative flux F and at least one geometric characteristic of the fire in various experiments which were carried out on controlled fires 2' using a device for characterizing a fire 1' also comprising at least one stereovision system 3 and at least one processing unit 5, as shown with reference to FIG. 4. According to the embodiment of FIG. 4, the device for characterizing a fire 1' comprises two stereovision systems 3, 3'. In order not to overload this FIG. 4, certain elements present in FIG. 1 have not been depicted, such as for example the optical axes A1, A1', A2, A2', the distances D, D' between the periphery of the fire and the stereovision system 3, 3', the image capture units 31, 31', 33, 33', the distances d, d separating these image capture units, etc. However, these elements are still present in this FIG. 4. In addition to the device for characterizing a fire 1 described with reference to FIG. 1, this device for characterizing a fire 1', shown in FIG. 4, has radiative flux sensors C1-C4 configured to measure the radiative flux F emitted by the controlled fire 2'. Obviously, the use of such radiative flux sensors C1-C4 in an operational situation, i.e., during an uncontrolled fire 2, is not possible for reasons of safety of the operators installing these radiative flux sensors C1-C4 in the field which would need to be moved as the fire spreads. The radiative flux sensors C1-C4 are arranged as follows: three sensors C1-C3 are arranged so as to be aligned parallel to the length of the controlled fire 2' and spaced apart from one another by a distance of approximately 1 meter, and two sensors C2 and C4 are arranged so as to be aligned perpendicular to this length of the controlled fire 2' and also spaced apart from one another by a distance of approximately 1 meter. Specifically, the intensity of the radiative flux F decreases the farther away from a fire. Thus, the inventors have found a linear relationship present between at least one geometric characteristic of the fire and the radiative flux F emitted by this controlled fire 2' or uncontrolled fire 2, the variation in distance between the different flux sensors C1-C4 with respect to the controlled fire 2' being a parameter to be taken into consideration. Specifically, the measured radiative flux decreases with the increasing distance between the fire 2' and the flux sensor C1-C4, but the linear relationship between at least one geometric characteristic of the fire and the radiative flux F is still present.

Figure 5A:
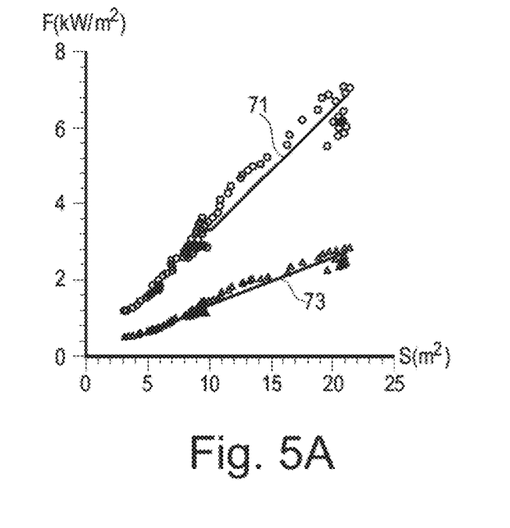

FIG. 5A shows the result of the measurements of radiative flux F performed by the flux sensors C2 and C4 from FIG. 4 as a function of the area S of the controlled fire 2', corresponding to a geometric characteristic of the fire, the measurement of which is performed by the processing unit 5. As mentioned above, the distance from the flux sensor C4 to the fire 2' is 1 meter greater than that from the flux sensor C2. In this FIG. 5A, the curve 71 corresponds to the calibration line for the flux sensor C2 and the curve 73 corresponds to the calibration curve for the flux sensor C4. From this FIG. 5A, it may be seen that the various points of correlation between the area S of this controlled fire 2' and the radiative flux F measured by the flux sensors C2, C4 follow their respective calibration lines 71, 73. In addition, these various correlation points respectively have, for the calibration lines 71, 73, a coefficient of determination ($R^2$), in the case of linear regression, of 0.96 (for the curve 71) and of 0.97 (for curve 73), which allows the linear character between the evolution of the radiative flux F coming from the fire and the area S of this controlled fire 2' or uncontrolled fire 2 to be confirmed. Specifically, the closer a coefficient of determination ($R^2$) in the case of linear regression is to 1, the more aligned the points are, the value 1 being obtained for a perfect straight line.

Figure 5B:
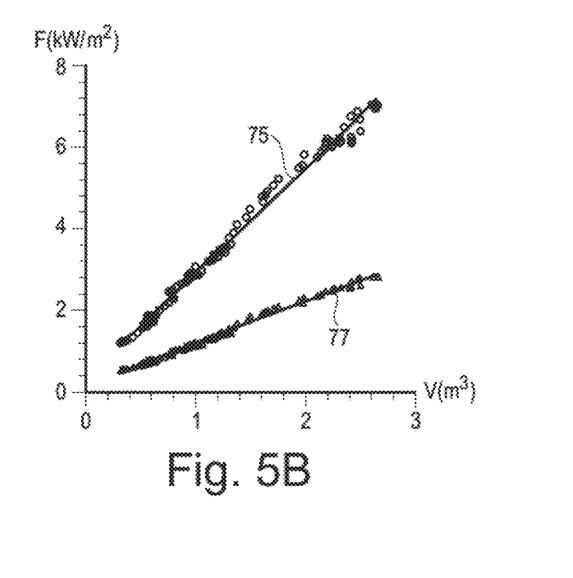

Additionally, FIG. 5B shows the result of the radiative flux measurements F performed by the sensors C2 and C4 from FIG. 4 as a function of the volume V of the controlled fire 2', corresponding to a geometric characteristic of the fire, the measurement of which is performed by the processing unit 5. The arrangement of the sensors C2 and C4 is the same as that used with reference to FIG. 5A. In this FIG. 5B, the curve 75 corresponds to the calibration line for the flux sensor C2 and the curve 77 corresponds to the calibration line for the flux sensor C4. From this FIG. 5B, it may be seen that the various points of correlation between the volume V of this controlled fire 2' and the radiative flux F measured by the flux sensors C2, C4 follow their respective calibration lines 75, 77. In addition, these various correlation points respectively have, for the calibration lines 75, 77, a coefficient of determination ($R^2$), in the context of linear regression, of 0.99 (for each of the curves 75 and 77), which allows the linear character between the evolution of the radiative flux F coming from the fire and the volume V of this controlled fire 2' or uncontrolled fire 2 to be confirmed.

Figure 6:
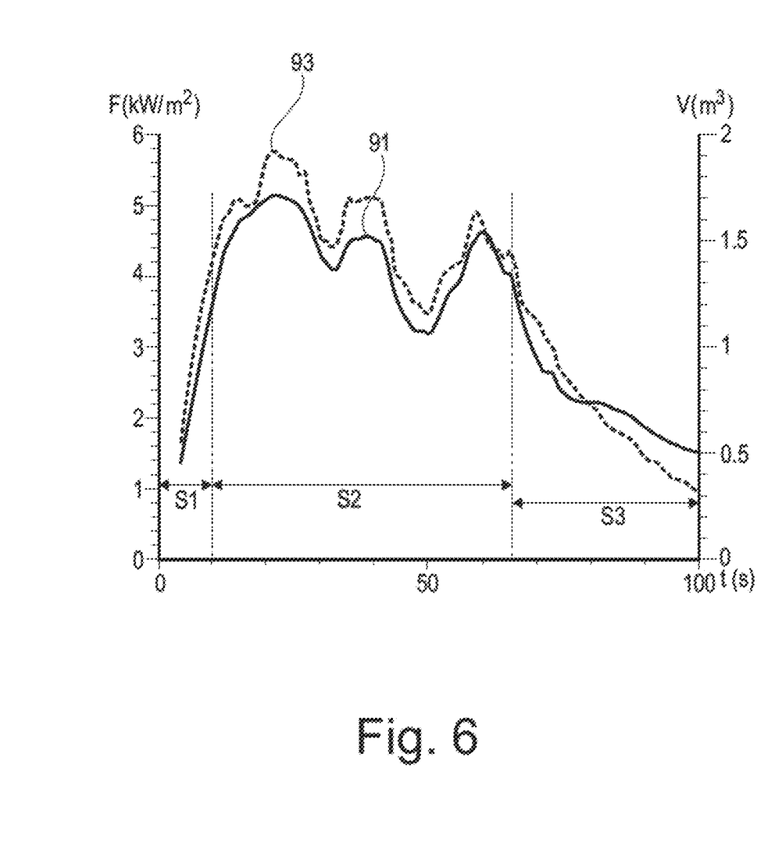

FIG. 6 shows a diagram presenting the evolution of the radiative flux (curve 91) and the evolution of the fire volume (curve 93) as a function of time t. More particularly, these curves 91, 93 are constructed with values filtered by moving average in order to cut high-frequency fluctuations. This FIG. 6 also shows the different stages in the evolution of the fire 2. More particularly, the period S1 corresponds to the start of the fire 2, the period S2 corresponds to the progressed fire 2 and the period S3 corresponds to the extinguishing of the fire 2. As shown in this FIG. 6, the changes in the radiative flux F emitted by the fire 2 and in the volume V of this fire 2 are similar over the period S2. Specifically, when the volume V of the fire increases, the radiative flux F thereof increases in substantially the same way, and the same applies when the volume V of this fire 2 decreases. This FIG. 6 therefore demonstrates the presence of proportionality, and therefore of a linear relationship, between the evolution of the volume V of the fire 2 and the evolution of the radiative flux F emitted by this fire 2.

Figure 7:
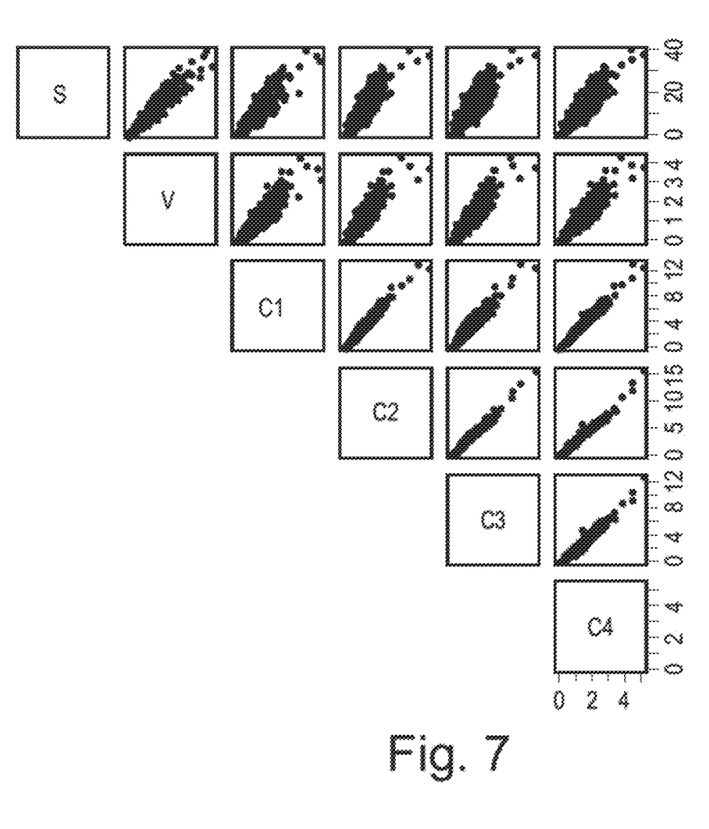

Next, FIG. 7 schematically shows scatter diagrams between the different geometric characteristics of the fire, namely: the area of the fire S, and the fire volume V, and the different flux sensors C1-C4 as arranged with reference to FIG. 4. More particularly, these various diagrams show fluctuations around the average value defined previously by moving average. According to this scatter diagram, the different flux sensors C1-C4 each have a scatter diagram that is substantially in the form of a straight line, which also supports the presence of a linear relationship linking the evolution of the radiative flux emitted by a fire and in particular the volume or the area of this fire 2. As a result, it is possible to be able to determine the radiative fluxes coming from the fire fairly easily and quickly in order to be able to determine zones in which this radiative flux is higher than a predefined threshold in order to allow the evacuation of operational personnel on the ground and of their equipment, such as firefighting vehicles for example, or in order to allow these operational personnel to advance according to the radiative fluxes F thus measured.

Returning to FIG. 1, when the device for characterizing a fire 1 comprises a single stereovision system 3, the processing unit 5 is configured to determine the radiative flux F on the basis of a linear relationship with a two-dimensional geometric characteristic of the fire. The use of a single stereovision system allows, for example, the area of the fire front, the fire area, or the dimensions of the fire front to be determined. This two-dimensional geometric characteristic of the fire may be represented by a three-dimensional curve. The use of a single stereovision system 3 may be particularly effective in the case of a static fire 2, such as for example a vehicle fire, an oil well fire, or a building fire. More particularly, the use of a single stereovision system 3 may be particularly effective when the fire 2 has a simple configuration, such as for example a rectilinear fire front. When the device for characterizing a fire 1 comprises a single stereovision system 3, it is not possible to obtain the fire volume V, but it is possible to obtain the fire area S or the area of the fire front. Specifically, in such a case, it is not possible to access images of the rear of the fire, for example, when the stereovision system 3 is arranged so as to take images of the front of the fire.

According to one particular aspect of this embodiment implementing only one stereovision system 3, a calibrated linear relationship may be expressed in the following form:

$$F = \beta \cdot S_F$$

with: F the determined radiative flux (in kW/m$^2$), $\beta$ a calibration coefficient dependent in particular on the type of fire, and $S_F$ the area of the fire front in square meters determined by the stereovision system 3. Depending on the type of geometric characteristic in question, a similar type of linear relationship may be used with the exception that the calibration coefficient may be modified, together with the value of the geometric characteristic. Furthermore, the value of the calibration coefficient $\beta$ is adjusted to the type of fire in question. Specifically, the value of this calibration coefficient $\beta$ takes different values if it is a forest fire or an industrial fire, for example.

The use of a single stereovision system 3, even though it may require special conditions, in particular regarding the configuration of the fire, is fairly simple to implement.

Figure 8A:
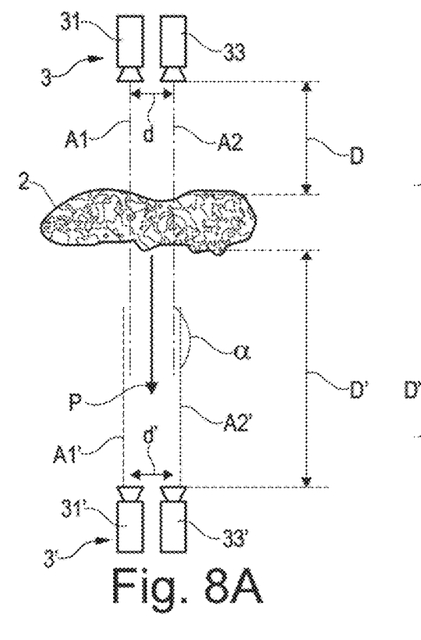
Figure 8B:
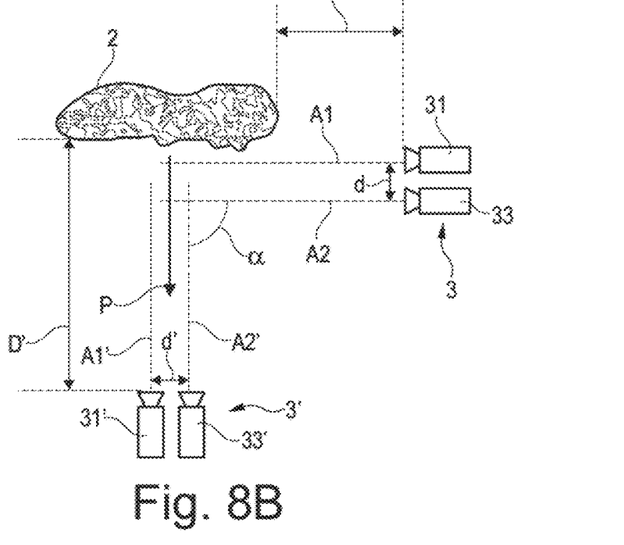

Alternatively, shown with reference to FIGS. 8A and 8B, when the device for characterizing a fire 1 comprises two stereovision systems 3, 3', the processing unit 5, 5' is configured to determine the radiative flux F on the basis of a linear relationship with a two-dimensional or three-dimensional geometric characteristic of the fire. According to this alternative, the stereovision systems 3, 3' are configured to be arranged so as to take different viewing angles of the fire in order to determine the fire volume V for example. The fire volume V is determined by applying a triangulation to all of the three-dimensional points of the fire present in the images captured by the first 31 and second 33 image capture units, such as for example a Delaunay triangulation. This triangulation makes it possible to obtain a closed shape 57 (shown with reference to FIG. 9B) on the basis of which the fire area S and volume V are determined. In addition, it is also possible to determine the frontal area of the fire with respect to a geolocated target, or to determine the form factor of this fire 2. The use of two stereovision systems 3, 3', covering different perspectives as described later with reference to FIGS. 8A and 8B, may be particularly effective for example when it is a spreading fire 2, such as for example a forest fire.

According to this alternative in which two stereovision systems 3, 3' are used in order to determine a geometric characteristic of the fire 2, the calibrated linear relationship allowing the radiative flux F emitted by the fire 2 to be determined may be expressed in the following form:

$$F = \gamma \cdot V$$

with: F the determined flux (in kW/m$^2$), $\gamma$ a calibration coefficient dependent in particular on the type of fire, and V the fire volume determined by the stereovision systems 3, 3'. As above, depending on the type of geometric characteristic in question, a similar type of calibrated linear relationship may be used with the exception that the calibration coefficient may be modified, together with the value of the geometric characteristic. Furthermore, the value of the calibration coefficient $\gamma$ is adjusted according to the type of fire in question and may have different values if it is a forest fire or an industrial fire, for example. The use of two stereovision systems 3, 3' and the study of the fire volume V makes it possible to have a more accurate estimate of the radiative fluxes F emitted by the fire via the device for characterizing a fire 1 than when only one stereovision system 3 is used.

According to the particular embodiments shown with reference to FIGS. 8A and 8B, the stereovision systems 3, 3' are arranged so that the optical axes A1, A2, A1', A2' of their first 31, 31' and second 33, 33' image capture units form an angle α. In order to be able to obtain the three dimensions of this fire 2, the angle α formed by the first A1 and second A2 optical axes of one of the stereovision systems 3 and the first A1' and second A2' optical axes of the other stereovision system 3' is between 900 and 1800.

More particularly according to the particular embodiment of FIG. 8A, the angle α is approximately 180°, i.e., one of the stereovision systems 3 is arranged on one side of the fire 2 and the other stereovision system 3' is arranged on the opposite side. Furthermore, according to this particular embodiment, one of the stereovision systems 3 is arranged behind the fire and the other stereovision system 3' is arranged so as to take images of the fire front. According to this embodiment, this fire propagates along the arrow P.

Additionally, according to the particular embodiment of FIG. 8B, the angle α is approximately 90°, i.e., the stereovision systems 3, 3' are arranged so that the optical axes A1, A2 of one of the stereovision systems 3 and the optical axes A1', A2' of the other stereovision system 3' are substantially perpendicular. According to this particular embodiment, the fire 2 also propagates along the arrow P.

With such arrangements of the stereovision systems 3, 3' shown with reference to FIGS. 8A and 8B, it is possible to obtain images allowing the various dimensions of this fire 2 to be derived in order to extract the geometric characteristics of this fire therefrom.

Furthermore, the distances D and D' separating the stereovision system 3, 3' from the fire 2 may be different and the distances d and d' separating the first image capture units 31, 31' and the second image capture units 33, 33' of each of the stereovision systems 3, 3' may be different and respectively adjusted according to the distances D and D'.

The use of two stereovision systems 3, 3', although possibly more cumbersome to implement, makes it possible to obtain complete determination of the geometric characteristic of the fire (both two-dimensional and three-dimensional) in question and therefore more accurate determination of the radiative flux F emitted by this fire 2.

Returning to FIG. 1, and to allow finer determination of the radiative fluxes F, the processing unit 5 may be configured to determine an uncertainty in the position of the fire 2 on the ground along an axis transverse to the fire 2, said uncertainty in the position of the fire 2 on the ground being determined by the relationship:

$$\Delta z = \frac{z^2}{Bf} \Delta d$$

in which:
z corresponds to the real distance D between the fire 2 and at least one stereovision system 3 (in meters),
B corresponds to the distance d between the first A1 and second A2 optical axes (in meters) at the first 31 and second 33 image capture units of the at least one stereovision system 3, f corresponds to the focal length of the first 31 and second 33 image capture units (in pixels) of the at least one stereovision system 3, and
Δd is the uncertainty in the disparity of the pixels (in pixels).

Figure 9A:
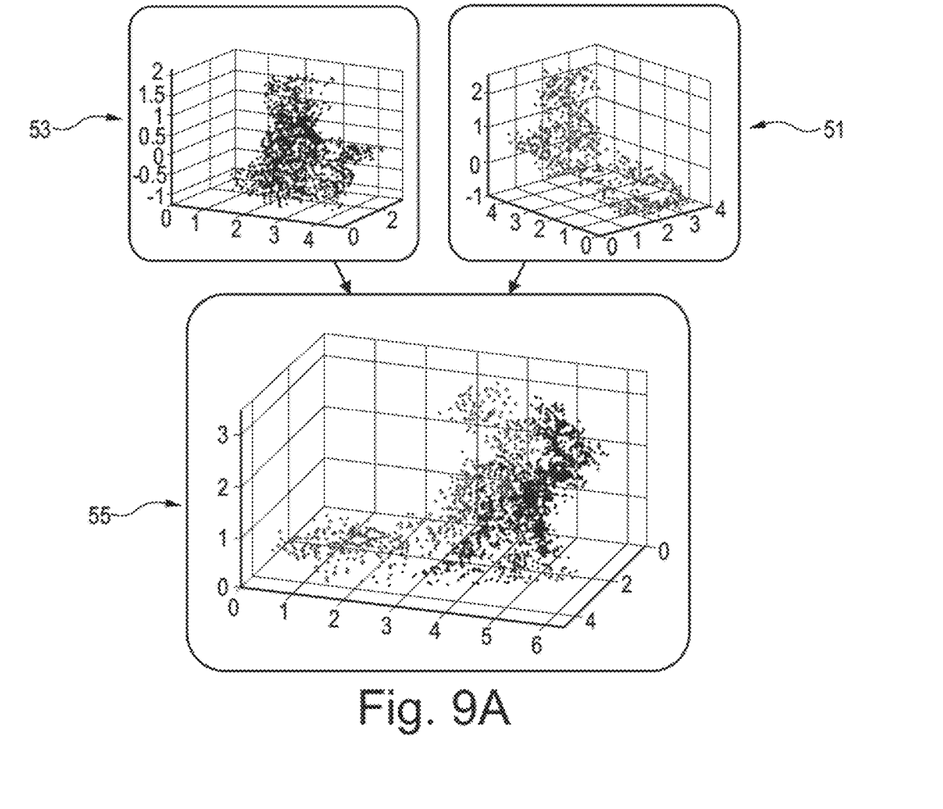

FIG. 9A shows a combination of the three-dimensional fire points determined from the images taken by the stereovision systems 3, 3' from FIG. 8B. More particularly, the representation 51 corresponds to the three-dimensional fire points determined by one of the stereovision systems 3 by triangulation, corresponding to a side view of this fire 2, the representation 53 corresponds to the three-dimensional fire points determined by the other stereovision system 3' by triangulation, corresponding to a view of the fire front, and the representation 55 corresponds to the combination produced by the processing unit 5 (visible in FIG. 1) of the three-dimensional fire points determined by the stereovision systems 3, 3' by triangulation allowing the determination of different geometric characteristics of this fire and mapping this fire. In order to identify and select the three-dimensional fire points (also called fire pixels), the processing unit 5 uses a conventional method known from the prior art, as described, for example, in the thesis by Doctor Tom Toulouse, entitled "Estimation par stereovision multimodale des caractéristiques géométriques d'un feu de végétation en propagation" [Estimation by multimodal stereovision of geometric characteristics of a propagating wildfire].

Figure 9B:
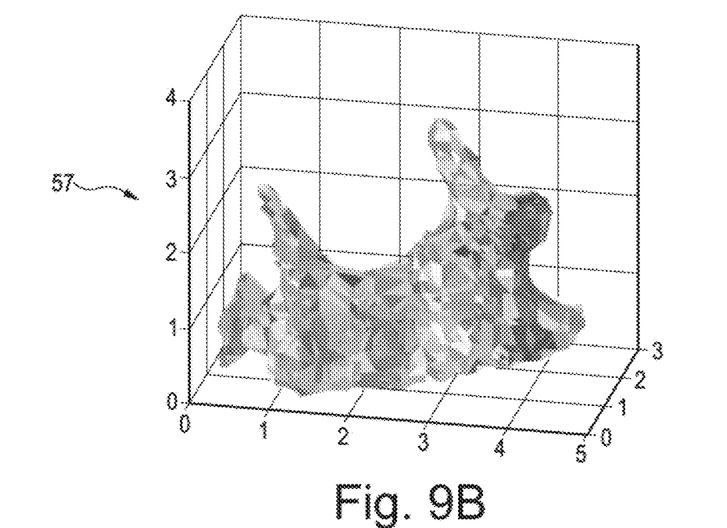

Additionally, FIG. 9B shows the three-dimensional structure of the fire reconstructed on the basis of the three-dimensional fire points determined by the stereovision systems 3, 3' from FIG. 8A by the processing unit 5. This three-dimensional representation may be the map shown on the display unit 9 (shown in FIG. 1 for example) in order to allow operational units on the ground to be guided, for example. Specifically, the use of the three-dimensional fire points on the ground makes it possible to determine the line of the fire front for example, which makes it possible for example to determine the direction of movement of this fire 2 and more particularly the zones to be hosed so as to fight this fire 2 more effectively, or the zones exposed to a radiative flux higher than a predetermined threshold value from which operational personnel, for example, must evacuate.

Figure 10:
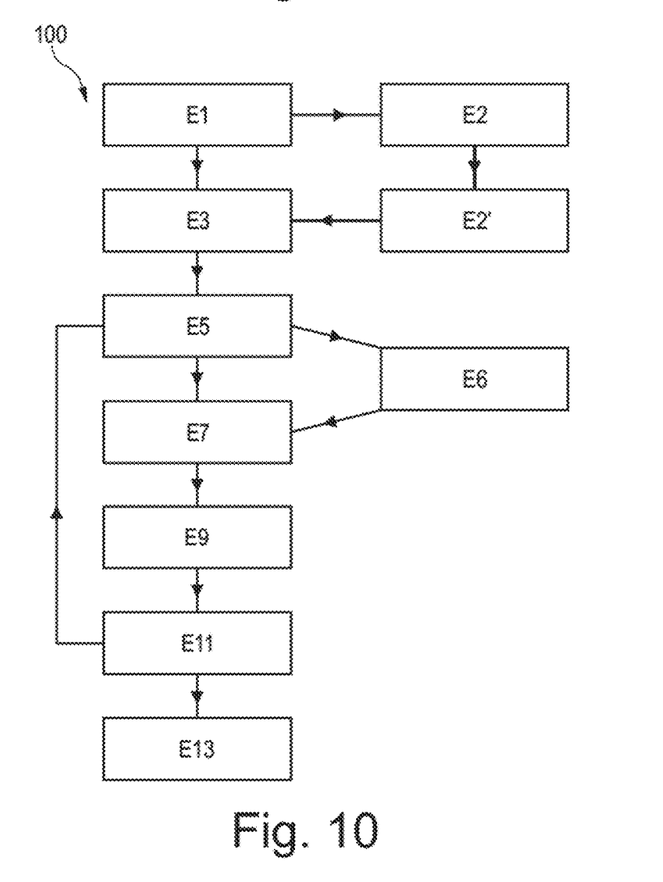

FIG. 10 schematically shows a method for determining radiative fluxes 100 in zones exposed to a radiative flux F emitted by a fire 2. This method for determining radiative fluxes 100 implements a device for characterizing a fire 1, comprising at least one stereovision system 3 that has a first 31 and a second 33 image capture unit and a processing unit 5, as described with reference to FIGS. 1 to 3 and 8A, 8B.

The method for determining radiative fluxes 100 comprises a step of positioning E1 of the at least one stereovision system 3 so that the first 31 and second 33 image capture units of the stereovision system 3 have a view in at least two dimensions of the fire 2.

The method for determining radiative fluxes 100 then comprises a step of entering E3 into the processing unit 5 of the distance D between the stereovision system 3 and the periphery of the fire 2 closest to the stereovision system 3. Depending on this distance D between the stereovision system 3 and the fire 2, it may be possible to modify the distance d between the first A1 and second A2 optical axes of the stereovision system 3 by moving the first 31 and second 33 image capture units closer together or farther apart.

The method for determining radiative fluxes 100 then implements a step E5 of triggering of the taking of images of the fire 2 by the first 31 and second 33 image capture units of the at least one stereovision system 3. According to one particular embodiment, the first 31 and second 33 image capture units of the at least one stereovision system 3 may be configured to take, for example, between 1 and 10 images per second. With such image capture frequencies, it is possible to track the evolution of the fire 2 in real time.

The method for determining radiative fluxes 100 then comprises a step of determining at least one geometric characteristic of the fire E7 by means of the processing unit 5, and then a step of determining a radiative flux E9 in different zones exposed to a radiative flux F emitted by the fire 2 by means of the processing unit 5 using a linear relationship calibrated with at least one geometric characteristic of the fire and at least one fire category chosen from among a plurality of predetermined fire categories. The predetermined fire category may be selected prior to the step of positioning E1 of the stereovision system 3, or during one of the steps preceding this step of determining at least one geometric characteristic of the fire E7. The method for determining radiative fluxes 100 then implements a step of depicting a map E11 showing the geometric characteristics of the fire and the radiative fluxes F in different zones exposed to a radiative flux F emitted by the fire 2 on a display unit 9 in communication with the processing unit 5. According to one particular embodiment, the step of determining the at least one geometric characteristic of the fire E7, the step of determining a radiative flux E9 and the depicting step E11 may be reiterated for each image taken by the at least one stereovision system 3 in order to allow the temporal evolution of the radiative fluxes F in the zones exposed to a radiative flux F emitted by the fire 2 to be determined. In addition, it is possible to communicate the evolution of the fire 2 to operational units in the field in real time in order to allow them to evacuate along with the equipment when the radiative flux F emitted by the fire exceeds a predetermined threshold. Moreover, it may also be possible to control their advance in the event of detecting a decrease in this radiative flux F in order to allow this fire to be fought more effectively. In addition, it is possible, by virtue of this method for determining radiative fluxes 100, and in particular the use of the device for characterizing a fire 1, using optical detection, to determine radiative fluxes F at a distance from the fire in order to ensure the safety of operational personnel and equipment, as mentioned above. During the implementation of the step of determining a radiative flux E9, the processing unit 5 compares the geometric characteristics of the fire and the fire category with pre-recorded data, said pre-recorded data comprising at least the linear relationships calibrated with the geometric characteristics of the fire and the predetermined fire categories, in the processing unit 5 or in the database 12, when present, in order to allow the generation of the linear model representative of the radiative flux F emitted by the fire 2. The referencing of the various pre-recorded data and the linear relationship between at least one geometric characteristic of the fire and the radiative flux F emitted by this fire are discussed in more detail later.

According to one particular embodiment and optionally, only the radiative fluxes F that have a value higher than a predetermined threshold are displayed on the display unit 9 so as to define danger zones.

Optionally, the device for characterizing a fire may comprise an anemometer 7 in communication with the processing unit 5 (shown in FIG. 1). In this case, the method for determining radiative fluxes 100 may further comprise a step of positioning and locating E2 the anemometer 7. This step of positioning and locating E2 the anemometer 7 is carried out upstream of the step of entering E3 into the processing unit 5 of the distance D between the stereovision system 3 and the periphery of the fire 2 closest to the stereovision system 3. The anemometer 7 may be arranged at a height of 2 meters from the ground, for example. Such an arrangement of the anemometer 7 allows good knowledge of the characteristics of the wind which may modify the radiative fluxes F emitted by the fire 2.

When the device for characterizing a fire 1 has the anemometer 7, the method for determining radiative fluxes 100 may also comprise a step of measuring the characteristics of the wind E2' so that the processing unit 5 corrects the value of the radiative flux F determined as a function of these characteristics of the wind in the step of determining a radiative flux E9.

According to one particular embodiment, the anemometer 7 may perform analyses of the characteristics of the wind with a frequency of 1 Hz, i.e., every second.

Additionally, it may be necessary to move the stereovision system 3 during a fire 2, for safety reasons for example, or the fire 2 may also move and in particular leave the field of view of the first 31 and second 33 image capture units. In such a case, the method for determining radiative fluxes 100 may further comprise, optionally, a step E13 of reconfiguring the processing unit 5. In general, this reconfiguring step E13 may be carried out in the event of a significant change in the distance D between the stereovision system 3 and the periphery of the fire 2 closest to the stereovision system 3, such that the fire 2 can no longer be seen in its entirety by the stereovision system 3.

Additionally, when the stereovision system 3 used by the device for characterizing a fire 1 is a multimodal stereovision system 3, the method for determining radiative fluxes 100 may further comprise a step E6 of superimposing the images taken in the visible range and in the near-infrared range. This superimposing step E6 is carried out between the step of triggering E5 the taking of images of the fire and of determining at least one geometric characteristic of the fire E7. Specifically, as discussed above, the use of images taken in the near-infrared range makes it possible to overcome detection problems due to the presence of smoke.

The method for determining radiative fluxes 100 therefore allows the exposure of goods and personnel to the radiative fluxes F emitted by the fire 2 to be measured in order to take appropriate measures. Moreover, this method 100 also allows the targeting of fire zones that need to be dealt with urgently in order to prioritize limiting the radiative flux F emitted by these fire zones. Additionally, when the device for characterizing a fire 1 is on board a motor vehicle 20, potentially mobile on the ground, it may provide a map of the radiative flux F radiated out in front of the fire front in order to be able to track this fire 2.

The embodiments described above are provided by way of illustrative and non-limiting examples. Indeed, it is entirely possible for those skilled in the art to use first 31 and second 33 image capture units other than those described above without departing from the scope of the present disclosure. Furthermore, it is entirely possible for those skilled in the art to use a greater number of stereovision systems 3 or processing units 5 than described in these various particular examples. Moreover, those skilled in the art will be able to use systems for setting up the bar 13 bearing the first 31 and second 33 image capture units other than a tripod 15 without departing from the scope of the present description, this bar 13 potentially, for example, being set up directly on a motor vehicle or on any other type of support.

Thus, the provision of a device for characterizing a fire 1 allowing the radiative fluxes F emitted by the fire 2 to be determined quickly and simply in order to define zones in which this radiative flux F exceeds a predefined threshold is possible by virtue of the device for characterizing a fire 1 described above in which a linear relationship allows the radiative flux F to be linked with at least one geometric characteristic of the fire and at least one fire category.

The invention claimed is:
1. A device for characterizing a fire, comprising:
at least one stereovision system comprising a first and a second image capture unit that are configured to take images of a fire, said first and second image capture units each having an optical axis, said first and second optical axes being separated from one another by a predetermined distance at the first and second image capture units; and
at least one processing unit configured to combine the images taken by the first and second image capture units of the at least one stereovision system in order to determine at least one geometric characteristic of the fire,
wherein the processing unit is configured to determine a radiative flux of this fire on the basis of a calibrated linear relationship established between a radiative flux of a reference fire as a function of at least one of the geometric characteristics of the fire and of at least one fire category chosen from among a plurality of predetermined fire categories in order to be able to determine zones exposed to a radiative flux emitted by the fire that exceeds a reference threshold; and
wherein the at least one stereovision system further comprises a locating system with centimeter precision, configured to transmit, to the at least one processing unit, the position, inclination and orientation of the first and second optical axes of the first and second image capture units of the at least one stereovision system.
2. The device for characterizing a fire of claim 1, wherein it further comprises an anemometer configured to determine characteristics of the wind, said anemometer being connected to the processing unit, the processing unit being configured to correct the radiative flux of the fire as a function of the characteristics of the wind.
3. The device for characterizing a fire of claim 1, wherein the at least one processing unit is configured to map the geometric characteristics of the fire and the radiative fluxes of different zones exposed to a radiative flux emitted by the fire, said processing unit being in communication with a display unit configured to display this map.
4. The device for characterizing a fire of claim 1, wherein the at least one stereovision system is a multimodal stereovision system configured to take images in the visible range on the one hand and images in the near-infrared range on the other hand.
5. The device for characterizing a fire of claim 1, wherein the at least one processing unit is configured to track the at least one geometric characteristic of the fire as a function of time so as to determine the temporal evolution of the fire and to track the radiative fluxes of the different zones exposed to a radiative flux emitted by the fire as a function of this temporal evolution of the fire.

6. The device for characterizing a fire of claim 1, wherein the at least one geometric characteristic of the fire is chosen from: the area of the fire front, the fire area, or the fire volume.
7. The device for characterizing a fire of claim 6, wherein it comprises a single stereovision system and in that the processing unit is configured to determine the radiative flux on the basis of a linear relationship with a two-dimensional geometric characteristic of the fire.
8. The device for characterizing a fire of claim 7, wherein the calibrated linear relationship satisfies the equation:

$$F = \beta \cdot S_F$$

with:
F: the determined value of the radiative flux in kW/m²;
$\beta$: a calibration coefficient; and
$S_F$: the area of the fire front measured in square meters.
9. The device for characterizing a fire of claim 6, wherein it comprises two stereovision systems configured to be arranged so as to take different viewing angles of the fire in order to determine the fire volume and in that the processing unit is configured to determine the radiative flux on the basis of a linear relationship with a two-dimensional or three-dimensional geometric characteristic of the fire.
10. The device for characterizing a fire of claim 9, wherein the calibrated linear relationship satisfies the equation:

$$F = \gamma \cdot V$$

with:
F: the determined value of the radiative flux in kW/m²;
$\gamma$: a calibration coefficient; and
V: the fire volume measured in cubic meters.
11. The device for characterizing a fire of claim 1, wherein the predetermined fire categories comprise at least one of the following categories: forest fires, liquid fires, or industrial fires, said predetermined categories potentially comprising a particular combustible material.
12. The device for characterizing a fire of claim 1, wherein the processing unit is configured to determine an uncertainty in the position of the fire on the ground along an axis transverse to the fire, said uncertainty in the position of the fire on the ground being determined by the relationship:

$$\Delta z = \frac{z^2}{Bf} \Delta d$$

in which:
z corresponds to the real distance between the fire and the at least one stereovision system (in meters),
B corresponds to the distance between the first and second optical axes (in meters) at the first and second image capture units of the at least one stereovision system (in meters),
f corresponds to the focal length of the first and second image capture units (in pixels) of the at least one stereovision system, and
$\Delta d$ is the uncertainty in the disparity of the pixels (in pixels).
13. The device for characterizing a fire of claim 1, wherein it further comprises a database in communication with the processing unit, said database being configured to store at least the calibrated linear relationships with the geometric characteristics of the fire and the predetermined fire categories.

14. The device for characterizing a fire of claim 1, wherein it further comprises a bar on which the first and second image capture units of the stereovision system are arranged.

15. A device for characterizing a fire, comprising:
at least one stereovision system comprising a first and a second image capture unit that are configured to take images of a fire, said first and second image capture units each having an optical axis, said first and second optical axes being separated from one another by a predetermined distance at the first and second image capture units; and
at least one processing unit configured to combine the images taken by the first and second image capture units of the at least one stereovision system in order to determine at least one geometric characteristic of the fire,
wherein the processing unit is configured to determine a radiative flux of this fire on the basis of a calibrated linear relationship established between a radiative flux of a reference fire as a function of at least one of the geometric characteristics of the fire and of at least one fire category chosen from among a plurality of predetermined fire categories in order to be able to determine zones exposed to a radiative flux emitted by the fire that exceeds a reference threshold; and
wherein the calibrated linear relationship satisfies the equation:

$$F = \beta \cdot S_F$$

with:
F: the determined value of the radiative flux in kW/m$^2$;
$\beta$: a calibration coefficient; and
$S_F$: the area of the fire front measured in square meters.

16. A device for characterizing a fire, comprising:
at least one stereovision system comprising a first and a second image capture unit that are configured to take images of a fire, said first and second image capture units each having an optical axis, said first and second optical axes being separated from one another by a predetermined distance at the first and second image capture units; and
at least one processing unit configured to combine the images taken by the first and second image capture units of the at least one stereovision system in order to determine at least one geometric characteristic of the fire,
wherein the processing unit is configured to determine a radiative flux of this fire on the basis of a calibrated linear relationship established between a radiative flux of a reference fire as a function of at least one of the geometric characteristics of the fire and of at least one fire category chosen from among a plurality of predetermined fire categories in order to be able to determine zones exposed to a radiative flux emitted by the fire that exceeds a reference threshold; and
wherein the calibrated linear relationship satisfies the equation:

$$F = \gamma \cdot V$$

with:
F: the determined value of the radiative flux in kW/m$^2$;
$\gamma$: a calibration coefficient; and
V: the fire volume measured in cubic meters.

* * * * *

UNITED STATES PATENT AND TRADEMARK OFFICE
CERTIFICATE OF CORRECTION

| | |
|---|---|
| PATENT NO. | : 11,989,903 B2 |
| APPLICATION NO. | : 17/289994 |
| DATED | : May 21, 2024 |
| INVENTOR(S) | : Lucile Rossi Tison et al. |

It is certified that error appears in the above-identified patent and that said Letters Patent is hereby corrected as shown below:

In the Specification

Column 1, Lines 32-33, change "for installations classées pour la protection de l'environment (sites" to --for i*nstallations classées pour la protection de l'environnement* (sites--

Column 2, Line 10, change "de la stereovision visible" to --de la stéréovision visible--

Column 13, Line 49, change "of 1280-960 pixels;" to --of 1280 × 960 pixels;--

Column 17, Line 15, change "900 and 1800." to --90° and 180°.--

Column 18, Line 24, change "par stereovision multimodale" to --par stéréovision multimodale--

Column 20, Lines 16-17, change "flux E9.
    According to one" to
--flux E9. According to one--

Signed and Sealed this
Sixteenth Day of July, 2024

Katherine Kelly Vidal
*Director of the United States Patent and Trademark Office*